(12) United States Patent
Wanstrath et al.

(10) Patent No.: US 8,378,315 B2
(45) Date of Patent: Feb. 19, 2013

(54) WINDSHIELD REPAIR DEVICE AND METHOD FOR REPAIRING WINDSHIELD

(75) Inventors: Kerry A. Wanstrath, Durango, CO (US); Rory R. Most, Durango, CO (US)

(73) Assignee: Glass Technology Inc., Durango, CO (US)

( * ) Notice: Subject to any disclaimer, the term of this patent is extended or adjusted under 35 U.S.C. 154(b) by 558 days.

(21) Appl. No.: 12/490,659

(22) Filed: Jun. 24, 2009

(65) Prior Publication Data

US 2010/0012857 A1 Jan. 21, 2010

Related U.S. Application Data

(60) Provisional application No. 61/075,405, filed on Jun. 25, 2008.

(51) Int. Cl.
*G21K 5/00* (2006.01)

(52) U.S. Cl. ............. 250/492.1; 250/493.1; 250/504 R; 250/504 H; 425/174; 425/174.4

(58) Field of Classification Search .................. 425/174, 425/174.4; 250/492.1, 493.1, 504 R, 504 H
See application file for complete search history.

(56) References Cited

U.S. PATENT DOCUMENTS

| | | | | |
|---|---|---|---|---|
| 6,302,670 B1 * | 10/2001 | Thomas et al. | ................. | 425/12 |
| 2004/0202458 A1 * | 10/2004 | Boyle et al. | .................... | 392/427 |
| 2008/0134971 A1 * | 6/2008 | Bradley | ........................ | 118/641 |

* cited by examiner

*Primary Examiner* — Nicole Ippolito

(74) *Attorney, Agent, or Firm* — Antonelli, Terry, Stout & Kraus, LLP

(57) ABSTRACT

A windshield repair device includes a bridge, an injector attached to the bridge and at least one UV, e.g., light emitting diode (LED), light source attached to the bridge or integrated into bridge or the injector to provide UV light within or around the injector. The UV, e.g., LED, light source can also be attached to an existing windshield repair device having a bridge and an injector attached to the bridge, so as to retrofit an existing windshield repair device to provide UV light within or around the injector. A method for curing resin provided in a crack in a windshield can be carried out by exposing the resin to UV light from at least one UV LED light source.

17 Claims, 5 Drawing Sheets

WINDSHIELD REPAIR DEVICE AND METHOD FOR REPAIRING WINDSHIELD

RELATED APPLICATION

This application is a non-provisional application claiming the benefit of the filing date of provisional application No. 61/075,405, filed Jun. 25, 2008, the entire content of which is incorporated herein in its entirety.

BACKGROUND OF THE INVENTION

Windshield repair has been performed starting in the early 1970's and continues to the present. UV light has been used as a curing method for the liquid material used in the glass repair process. This has been accomplished primarily in two ways, one: natural UV light from the sun, or two: UV light generated by a UV lamp such as a fluorescent or incandescent type bulb. All methods until the present invention use a separate UV lamp product as a light source.

Windshield repair may be conducted using a bridge, which is an apparatus used to hold a resin injection system over the glass damage area so vacuum and pressure cycles can effectively remove trapped air from the glass damaged area. The pressure cycle is needed to fill glass damage with a UV curable liquid resin material. All current methods use an independent separate lamp product, typically a fluorescent UV lamp or direct sunlight for the curing process.

Typical curing does not address the glass damage area directly under the injector seal because the UV light cannot penetrate beyond the seals. All current seals are constructed of either a solid rubber such as Buna-N or opaque silicone material. All current curing under a pressure cycle require two steps. First a curing of the damage area outside the perimeter of the injector seal, then the removal of the injector so as to expose the area directly under the injector called the "Repair Pit". Once the injector is removed this area can be exposed to UV Light for curing of the resin.

U.S. Pat. No. 6,898,372 to Boyle et al discloses a lamp system for curing resin in glass in which an annular or round shaped lamp is used to "accommodate the resin injection system." In Boyle et al, the bulb housing has a hole, proximately at a center of the substantially annular shape of the bulb housing, configured to accommodate the resin injection system. As a result, the light bulb and the bulb housing surround the resin injection system with a relatively large diameter.

However, in the system of Boyle et al, the annular fluorescent light source is specifically designed to be annular to facilitate the needed and separate resin injection system ("having a top and a hole in the top, proximately at a center of the substantially annular shape of the bulb bossing to facilitate operation of the injection system, said housing configured to accommodate the resin injection system"). This system has a separate housing for resin injection and a separate housing for the lamp. The center open area of the round or annular lamp allows for the placement of an injection system. The two apparatus are separate and operate independently of each other. While the two apparatuses can be made to connect to each other they are still separate and work independently of each other.

SUMMARY OF THE INVENTION

The present invention relates to a windshield repair device having a bridge, an injector attached to the bridge and at least one light emitting diode (LED) light source, e.g., a UV LED, attached to the bridge or the injector to provide light, e.g., UV light, within or around the injector.

The present invention also relates to an LED, e.g., UV LED light source that can be attached to a windshield repair device having a bridge and an injector attached to the bridge, so as to retrofit an existing windshield repair device to provide light, e.g., UV light directly over, within or around the injector.

The present invention also relates to a method for curing resin provided in a crack in a windshield by exposing the resin to UV light from at least one UV LED light source.

DETAILED DESCRIPTION OF THE INVENTION

Typical glass repairs are cured by removing the bridge and injector assembly or apparatus after the final pressure cycle, then attaching a UV light source above the effected repair area. This method can allow for the liquid resin to "back out" of the repair area because of inadequate or incomplete vacuum capabilities thus leaving small pockets of air within the glass damage area. If the resin can be cured while the liquid resin is under pressure the hardened or cured material now becomes a solid and cannot be "backed out" by the air pressure within the glass repair damage. The present invention allows the technician to cure the damaged glass repair area in its entirety using the bridge, injector lamp combination while under pressure.

The present invention provides small UV lights, e.g., UV LED lights, in the bridge itself (the device commonly used to hold the resin injection system on to the glass) or in an attachment or holding device that attaches to the bridge. Thus, the present invention incorporates an assembly used for windshield repair sometimes called a bridge and an ultraviolet (UV) light source, for example a light emitting diode (LED) UV light source. By using a UV light source such as small LED UV light sources and by incorporating the LEDs into the bridge or into an attachment or holding device that attaches to the bridge, a functionally unitary device can be achieved. Thus, the present invention allows the UV light source to be directly over the repair area while the repair is being accomplished; once the repair is finished to the point of curing the liquid material, the bridge can stay directly over the repair with pressure being applied to force as much liquid resin material into the damaged area. For example, several small LED UV lights may be positioned in the bridge directly around the Injector to ensure a complete cure around the entire perimeter of the repair area.

Curing under pressure is a common procedure within the glass repair industry, however the ability to do so simultaneously around the entire perimeter or circumference of the glass damage area is unique using small UV, e.g., LED light sources built into the bridge apparatus and surrounding the injector or built in to a holding device that can be attached to the bridge apparatus and surrounding the injector.

Figure 1:
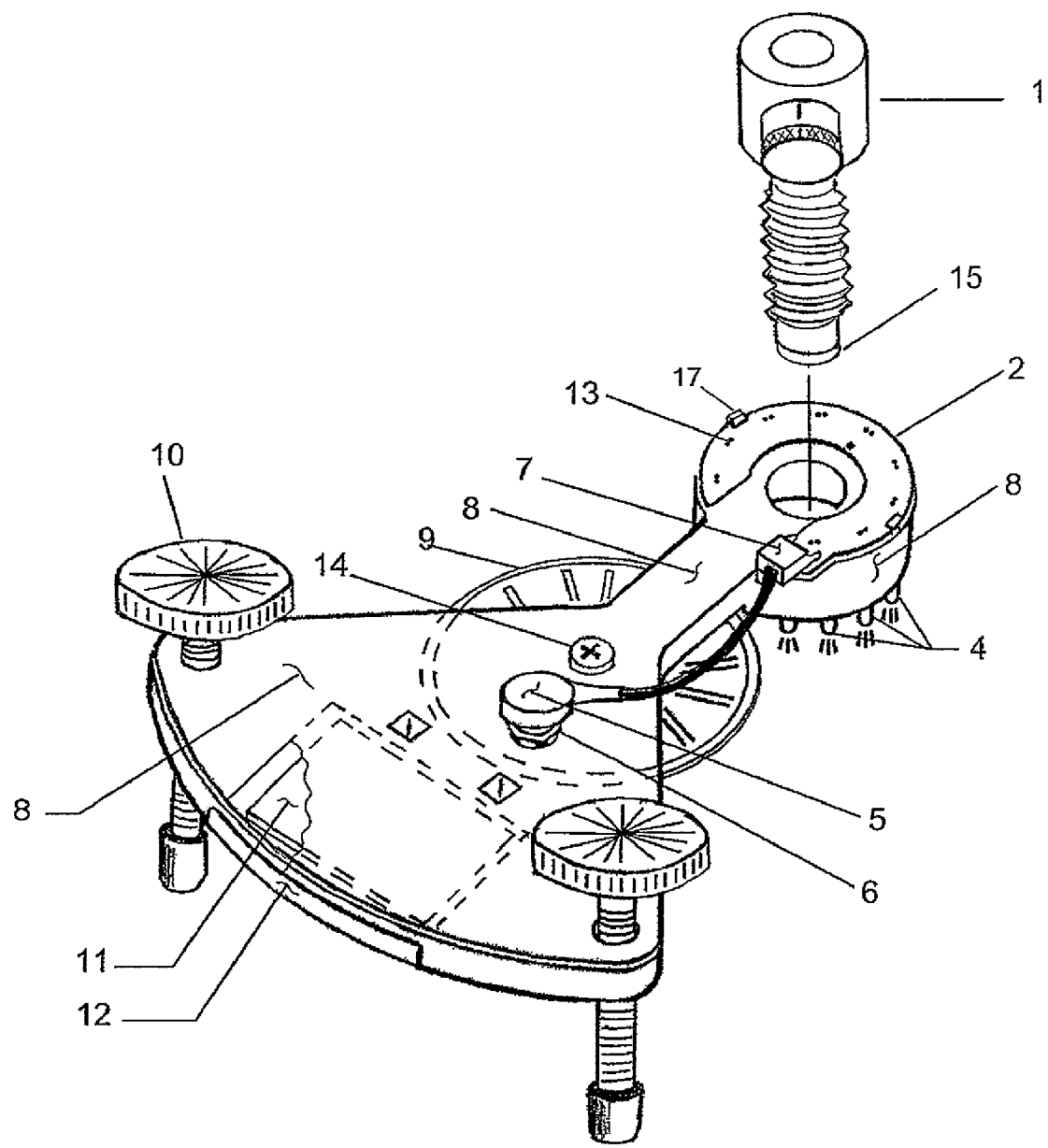
FIG. 1 is a perspective view of one embodiment of the windshield repair device of the present invention.

One embodiment of the windshield repair device of the present invention is shown in perspective views in FIG. 1. As is known to those skilled in the art, a windshield repair device typically includes an injector 1 that attaches, e.g., by screwing it into a bridge assembly 8, to enable injector seal 15 of the injector 1 to seal the injector 1 against glass, e.g., a windshield, during the repair, as shown in more detail in FIG. 2. As is known in the art, the injector 1 is used to inject resin into a crack in the glass. The bridge 8 can be in many different shapes, e.g., it can have only one arm or three arms joined at a central location at which a bridge suction cup is provided (e.g., as shown in the drawing Detail B of applicants' provisional application No. 61/075,405), but in this embodiment has the shape shown in FIG. 1 including a main support portion and an extension arm to which the injector 1 attaches, e.g., by screwing it into a bridge assembly 8. The main support portion of the bridge also supports on its underside a bridge suction cup 9 that attaches to the bridge 8 by bridge suction cup bolt 14 to provide a secure vacuum adhesion to hold the bridge 8 on the glass. The main support portion of the bridge also supports adjusting screws 10 can be used to level the bridge 8 so that the injector 1 can form even seal via seal 15 over the glass break. Further characteristics and the operation of such a windshield repair device not provided here would be known to those skilled in the art.

The windshield repair device of the present invention is different from a conventional windshield repair device in a number of important aspects. In the embodiment shown in FIG. 1, a plurality of UV light sources 4, e.g., LED UV lights in this preferred embodiment, are provided in the bridge 8 closely spaced around the injector 1. The LED UV lights 4 in this preferred embodiment are held in openings in the bridge 8 by any appropriate socket arrangement and extend downwardly therefrom. The LED UV lights 4 are electrically connected to contacts 13, having positive and negative contact points for the UV sources 4, of a circuit board 2. The circuit board 2 can be held on the bridge 8 by, e.g., clips 17, which can, e.g., be made integrally with bridge 8. A battery 11 provided in battery compartment 12 in bridge 8 relays dc current to UV light sources 4 via receptacle 6, the cord 5, the circuit connector box 7, the circuit board 2 and electrical connectors 13. Of course, any other source of power for the UV lights can be used as would be appreciated by those skilled in the art. For example, any ac or dc source could be used.

Figure 2:
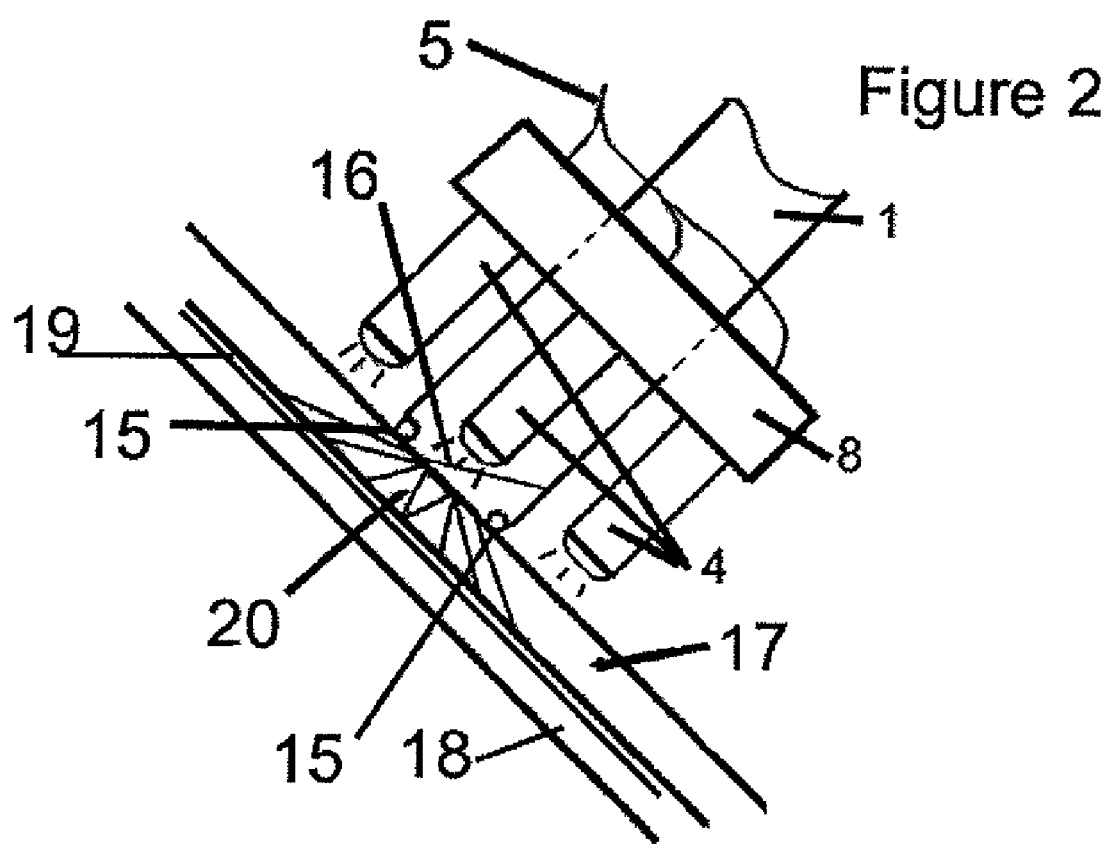
FIG. 2 is a schematic view showing a close-up view of the injector tip area of the windshield repair device of the present invention.

FIG. 2 is a schematic view showing a close-up view of the injector tip area of the windshield repair device of the present invention. As shown in FIG. 2, the injector seal 15 of the injector 1 is pressed against glass, e.g., a windshield, during the repair procedure. In the example shown, the windshield comprises an outer glass layer 17 and an inner glass layer 18 held together by a PVB layer 19, as is known in the art. The injector seal 15 of the injector 1 is pressed against outer glass 17 over the damage/crack area 20. As is known in the art, vacuum and pressure cycles are applied to remove trapped air from the glass damaged area 20, and a pressure cycle fills glass damage area 20 with a UV curable liquid resin material 16. According to the present invention, the UV LEDs provided around the injector 1 are used to cure the resin 16 in the damaged area 20 while the bridge remains attached to the outer layer 17 of the windshield.

In one aspect of the present invention, the injector seal 15 (which is conventionally opaque, not clear) can be made of a clear material. As shown in more detail in FIG. 2, clear injector seal 15 allows for UV light 4' from UV LEDs 4 to penetrate from outside of the injector seal 15 and cure the resin in the damaged area not only directly under the UV LEDs 4 but also in the damaged area 20 under the inside area of the injector seal 15. This clear seal 15 helps illuminate the area of glass damage directly under the seal 15 and injector thus allowing for curing said area under pressure via the injector.

Figure 3:
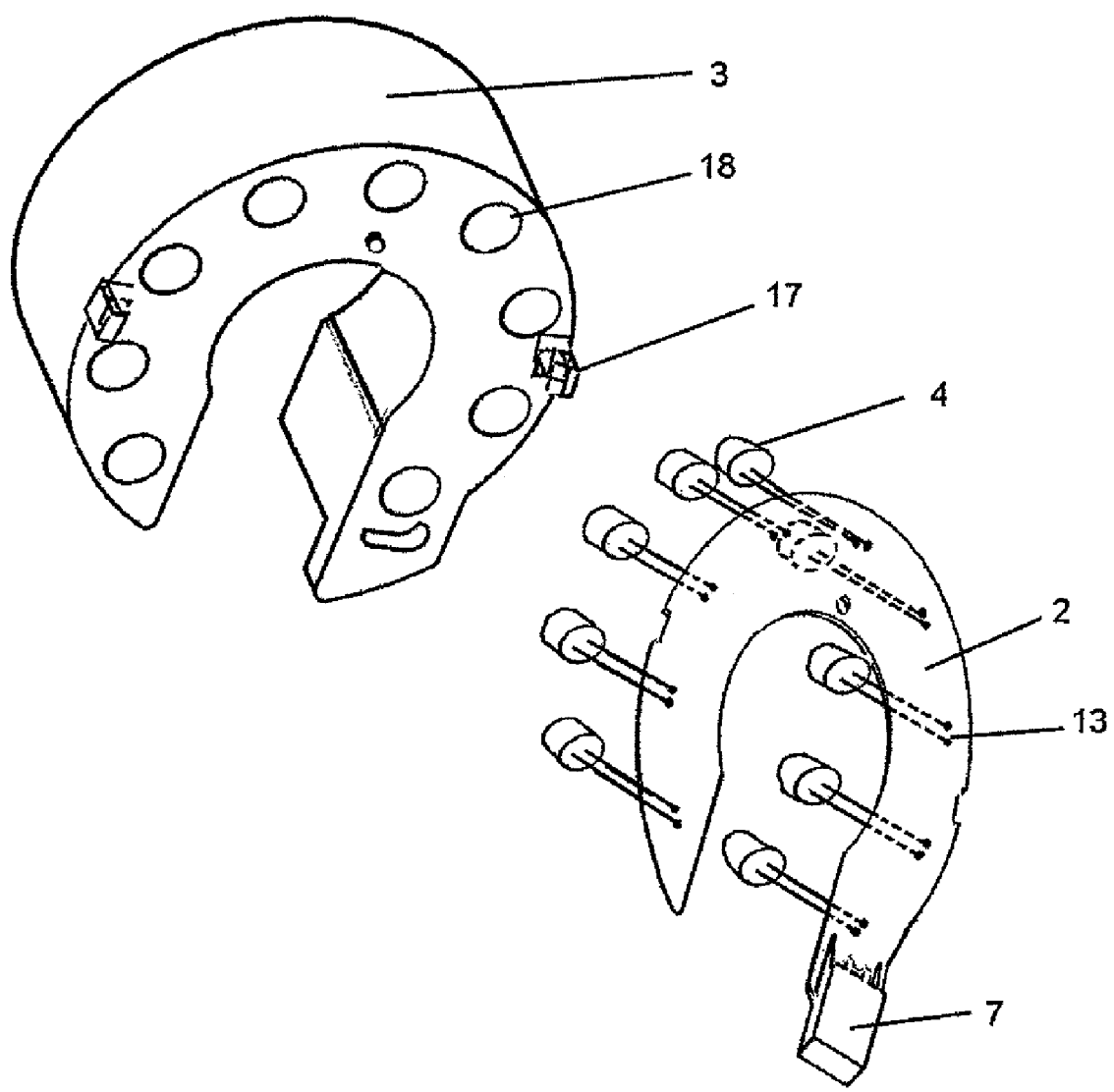
FIG. 3 is an exploded perspective view of another embodiment of the present invention showing an attachment for a windshield repair device.
Figure 4:
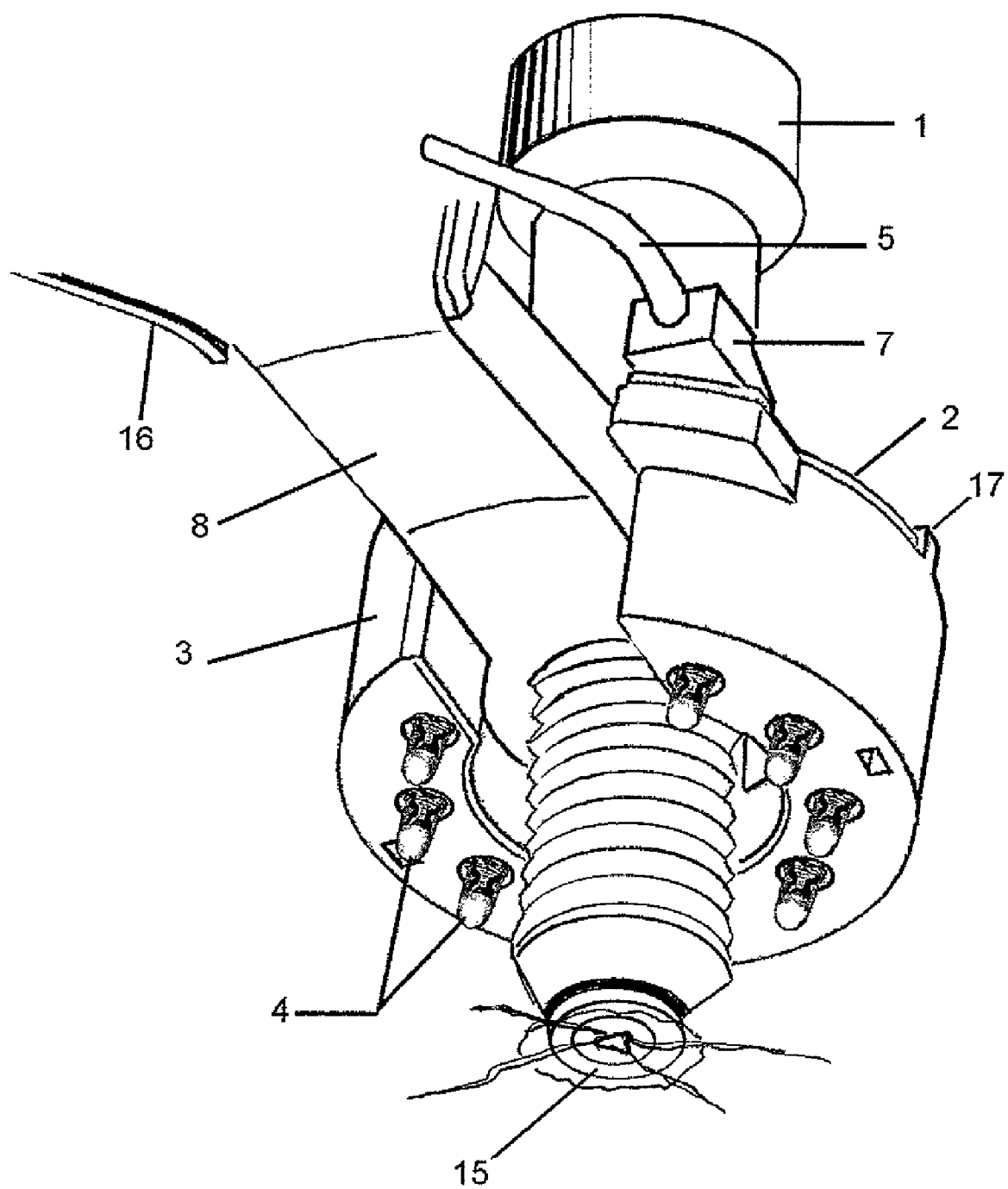
FIG. 4 is a perspective view showing the attachment of FIG. 3 attached to a windshield repair device.

FIGS. 3 and 4 show another embodiment of the present invention. FIG. 3 is an exploded perspective view of another embodiment of the present invention showing an attachment for a windshield repair device, and FIG. 4 is a perspective view showing the attachment of FIG. 3 attached to a windshield repair device.

In the embodiment of FIG. 1, the LEDs are held in that portion of the bridge of a windshield repair device that holds the injector. In the embodiment of FIGS. 3 and 4, a holding device 3 is provided. The holding device can have a shape corresponding to the shape of that portion of the bridge of a windshield repair device that holds the injector. For example, the holding device 3 can have a substantially C-shaped or substantially semi-circular cross-section. As shown in FIG. 4, the holding device 3 can be slipped over the portion 21 of the bridge 8' of a windshield repair device that holds the injector 1, in this embodiment from the underside of the portion 21. In this embodiment, the holding device 3 is secured on the portion 21 by providing the circuit board 2 over the top of portion 21 and securing with clips 17, thus securing the assembly of the holding device 3 and the circuit board 2 on portion 21 of bridge 8'. The holding device 3 holds a plurality of UV light sources 4, LED UV lights in a preferred embodiment, in openings 18 in the holding device 3 by any appropriate socket arrangement. A power cord 5 relays power to the circuit connector box 7. The power cord 5 can be electrically connected to a power source provided separately from the windshield repair device or provided in or on a holder 16 that can be attached to the bridge 8'. Thus, this embodiment can retrofit an existing windshield repair device to provide UV light within or around the injector.

Figure 5:
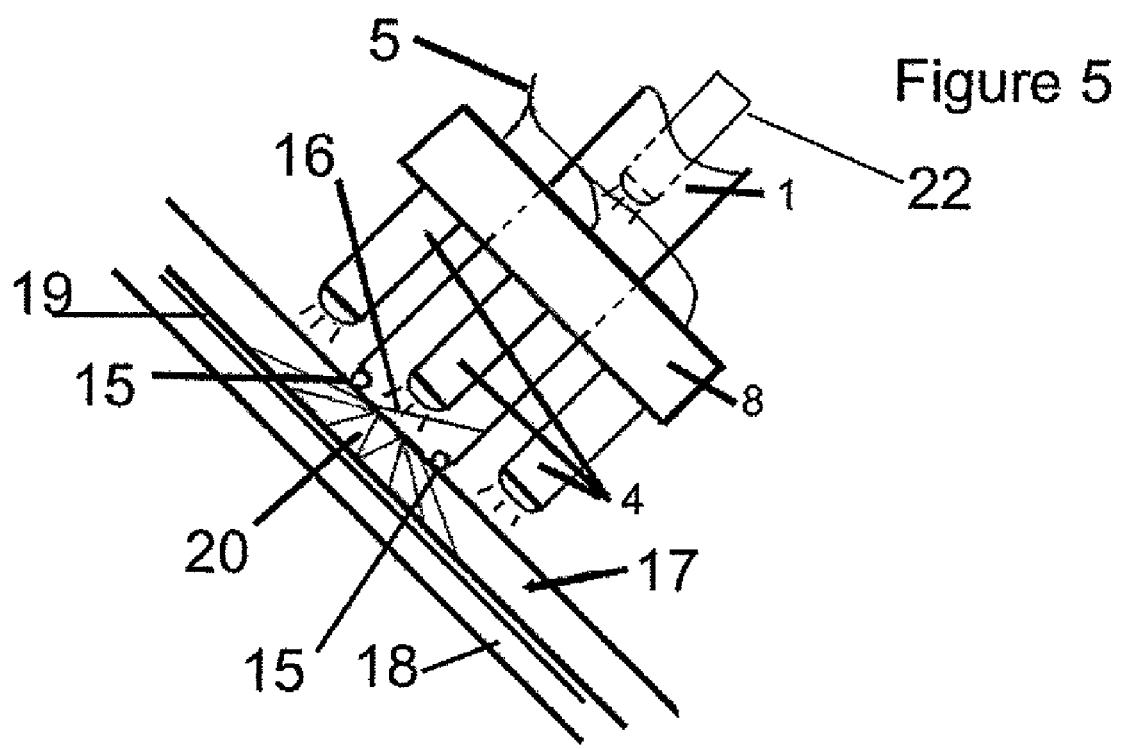
FIG. 5 is a schematic view showing a close-up view of the injector of another embodiment of the windshield repair device of the present invention.

In the embodiment shown in FIG. 5, to aid in a complete and pressurized cure, a UV LED light source 22 can be added to the inside of the injector assembly 1. This ensures a cure directly over the "Repair Pit" area 20 of the repair. A special non-stick material such as Teflon™ could be used to reduce the liquid resin materials adhesion to the inside of the injector 1 and the seal area 15.

The UV lights used in the present invention can be, e.g., lights having specific range of the visible, blue and UV light spectrum between 320 nm to 460 nm. For example UV LED lights having the part numbers NSPU510CS, NSHU550B, NSHU590B, NSSU100A or NCSU033A sold by NICHIA Corp Japan of 491 Oka, Kaminaka-Cho, Anan-Shi, TOKUSHIMA 774-8601, JAPAN can be used.

While, in the preferred embodiments described above, the LEDs are UV LEDs, blue light, white or visible light can be used by changing the resin to one that cures using light matching the wavelength of the source, e.g., LED.

According to the present invention, because of the ability to cure the glass damage entirely while under injector pressure, the liquid resin is compressed within the repair area and this substantially reduces shrinkage of the liquid resin material during the curing process. The results are improved glass repair clarity and strength.

Because the size of LED light sources are small relative to fluorescent tubes the UV light source can be placed closer to the affected glass repair damage area. This improved positing of the light improves curing intensity and cure time. Prior to this invention, the lamp was either held close to the area by hand or with the aid of suction cups.

In addition to attaching the LED UV light source to the bridge it can also be alternately attached to the injector via the injectors threads either over or under the bridge. Either way allows for UV light to be used to cure windshield or glass repair damage. Integrating the light source to either the bridge or the Injector accomplishes the desired curing under pressure.

To aid in UV light absorption by the clear seal, the injector tip has grooves that allow for the light to have extra contact with the seal sidewall. This improves the seals exposure to the UV light source. As an alternate to the grooves, a clear glass of acrylic injector tip could be used to add in the transmitting of UV light. Making grooves or notches in the injector tip or end that houses the clear seal adds in the transmission of UV light into the center or "Repair Pit." These small grooves expose the Clear seal sidewall to more UV light hence aid in the adsorption of UV light by the liquid resin.

It will be apparent to those skilled in the art that various modifications and variations can be made in the devices and methods of the present invention without departing from the spirit or scope of the invention. Thus, it is intended that the present invention cover any and all modifications and variations of this invention that come within the scope of the claims and their equivalents.

We claim:

1. A windshield repair device comprising a bridge, an injector attached to the bridge for injecting resin into a damaged area of a windshield and a plurality of LED light sources attached to the bridge to provide light around the injector, wherein the LED light sources are attached to the bridge by being held in openings and extend downwardly from the openings closely spaced around the injector so as to allow the light from the LED light sources to cure resin injected by the injector into the damaged area of a windshield.

2. The windshield repair device according to claim 1, wherein an LED light source is provided within the injector.

3. The windshield repair device according to claim 1, wherein the light sources are UV LED light sources.

4. The windshield repair device according to claim 1, wherein the plurality of LED light sources are attached directly to the bridge closely spaced around the injector.

5. The windshield repair device according to claim 4, wherein the LED light sources are held in the openings in the bridge by a socket arrangement.

6. The windshield repair device according to claim 5, further comprising a battery compartment provided in the bridge.

7. The windshield repair device according to claim 5, wherein the injector comprises an injector seal configured to be pressed against outer glass of the windshield, the injector seal being made of a clear material.

8. The windshield repair device according to claim 1, further comprising a battery compartment provided in the bridge.

9. The windshield repair device according to claim 1, wherein the bridge comprises a main support portion and an extension arm to which the injector attaches, a suction cup attached to an underside of the main support portion, and adjusting screws attached to the main support portion adapted to level the bridge on the windshield.

10. The windshield repair device according to claim 9, wherein the plurality of LED light sources are attached directly to the bridge closely spaced around the injector.

11. The windshield repair device according to claim 10, wherein the LED light sources are held in the openings in the bridge by a socket arrangement.

12. The windshield repair device according to claim 11, further comprising a battery compartment provided in the bridge.

13. The windshield repair device according to claim 1, wherein no reflector is provided in the openings in which the LED light sources are held.

14. A light source for a windshield repair device, comprising holding device having a shape adapted to be connected to a bridge of a windshield repair device and fit around an injector of the windshield repair device for injecting resin into a damaged area of a windshield, and a plurality of LED light sources provided on the holding device, wherein the LED light sources are attached to the holding device by being held in openings and extend downwardly from the openings, the holding device and openings being configured such that the LED light sources are closely spaced around the injector so as to allow the light from the LED light sources to cure resin injected by the injector into the damaged area of a windshield.

15. The UV light source for a windshield repair device according to claim 14, wherein LED light sources are UV LED light sources.

16. The UV light source for a windshield repair device according to claim 14, wherein no reflector is provided in the openings in which the LED light sources are held.

17. A method for curing resin provided in a crack in a windshield, comprising:
   providing a windshield repair device having comprising a bridge, an injector attached to the bridge for injecting resin into a damaged area of a windshield and at least one a plurality of UV LED light source sources attached to the bridge or the injector to provide light within or around the injector, wherein the UV LED light sources are attached to the bridge by being held in openings and extend downwardly from the openings closely spaced around the injector so as to allow the light from the UV LED light sources to cure resin injected by the injector into the damaged area of a windshield;
   injecting resin into the damaged area of a windshield; and
   exposing the resin to UV light from the plurality of UV LED light sources of the windshield repair device according to claim 1.

* * * * *